United States Patent
Kimura et al.

(10) Patent No.: US 12,325,471 B2
(45) Date of Patent: Jun. 10, 2025

(54) STEERING APPARATUS

(71) Applicant: Hitachi Astemo, Ltd., Hitachinaka (JP)

(72) Inventors: Makoto Kimura, Hitachinaka (JP); Yasuhito Nakakuki, Hitachinaka (JP); Kohtaro Shiino, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 967 days.

(21) Appl. No.: 17/291,336

(22) PCT Filed: Oct. 29, 2019

(86) PCT No.: PCT/JP2019/042287
§ 371 (c)(1),
(2) Date: May 5, 2021

(87) PCT Pub. No.: WO2020/095752
PCT Pub. Date: May 14, 2020

(65) Prior Publication Data
US 2022/0001916 A1  Jan. 6, 2022

(30) Foreign Application Priority Data
Nov. 6, 2018 (JP) .................................. 2018-208734

(51) Int. Cl.
*B62D 5/00* (2006.01)
*B62D 5/04* (2006.01)

(52) U.S. Cl.
CPC .......... *B62D 5/003* (2013.01); *B62D 5/0427* (2013.01); *B62D 5/0481* (2013.01)

(58) Field of Classification Search
None
See application file for complete search history.

(56) References Cited

U.S. PATENT DOCUMENTS 6,208,923 B1 * 3/2001 Hommel ................ B62D 5/003
                                                    701/41
6,548,969 B2 * 4/2003 Ewbank ................ B62D 5/003
                                                    180/402

(Continued)

FOREIGN PATENT DOCUMENTS

CN     103732478 A  *  4/2014  ............ B62D 5/003
CN     103732478 B  * 10/2016  ............ B62D 5/003

(Continued)

OTHER PUBLICATIONS

International Search Report dated Dec. 24, 2019 issued in International Application No. PCT/JP2019/042287, with English translation, 3 pages.

(Continued)

*Primary Examiner* — Kevin R Steckbauer
(74) *Attorney, Agent, or Firm* — FOLEY & LARDNER LLP (57) ABSTRACT

A steering apparatus includes a first CAN communication line provided between a steering input mechanism and a steering mechanism controller and configured to output a first steering operation amount signal output from a first steering operation amount signal output portion to the steering mechanism controller, and a communication line provided between the steering input mechanism and the steering mechanism controller and configured to output a second steering operation amount signal to the steering mechanism controller without intervention of a first microprocessor.

9 Claims, 3 Drawing Sheets

(56) References Cited

U.S. PATENT DOCUMENTS

| | | | | |
|---|---|---|---|---|
| 6,820,715 | B2* | 11/2004 | Laurent | B62D 5/0424 180/443 |
| 7,130,728 | B2* | 10/2006 | Suzuki | B62D 6/008 180/413 |
| 7,289,889 | B2* | 10/2007 | Naik | B60W 50/023 701/1 |
| 7,433,767 | B2* | 10/2008 | Takeuchi | B62D 5/003 180/443 |
| 10,229,547 | B2* | 3/2019 | Isozaki | G07C 5/085 |
| 10,442,459 | B2* | 10/2019 | Siskoy | B62D 5/006 |
| 10,752,282 | B2* | 8/2020 | Klesing | B62D 5/0484 |
| 11,332,140 | B2* | 5/2022 | Yamashita | B60W 10/20 |
| 11,332,185 | B2* | 5/2022 | Jeong | B62D 5/0481 |
| 11,511,762 | B2* | 11/2022 | Huang | B60W 60/0018 |
| 11,958,546 | B2* | 4/2024 | Jeong | B62D 5/0484 |
| 2002/0084757 | A1* | 7/2002 | Ewbank | B62D 5/003 318/34 |
| 2005/0159866 | A1* | 7/2005 | Takeuchi | B62D 5/003 180/443 |
| 2006/0015231 | A1* | 1/2006 | Yoshimura | B60L 3/0076 701/1 |
| 2006/0037806 | A1* | 2/2006 | Kasahara | B62D 6/008 180/402 |
| 2014/0172236 | A1* | 6/2014 | Nishikawa | B62D 5/003 701/42 |
| 2018/0099694 | A1* | 4/2018 | Scheibel | B62D 5/0484 |
| 2018/0257703 | A1* | 9/2018 | Dreyer | B62D 5/0457 |
| 2019/0009813 | A1* | 1/2019 | Siskoy | B62D 5/0484 |
| 2019/0100237 | A1* | 4/2019 | Klesing | B62D 5/0493 |
| 2020/0047764 | A1* | 2/2020 | Yamashita | B60W 30/18145 |
| 2021/0276613 | A1* | 9/2021 | Beres | B62D 5/046 |
| 2022/0001916 | A1* | 1/2022 | Kimura | B62D 5/0481 |
| 2022/0250675 | A1* | 8/2022 | Jeong | H04L 12/40189 |
| 2023/0101263 | A1* | 3/2023 | Suzuki | B62D 5/046 701/41 |

FOREIGN PATENT DOCUMENTS

| | | | | |
|---|---|---|---|---|
| CN | 109204442 | A * | 1/2019 | B60R 16/0238 |
| CN | 109204442 | B * | 4/2021 | B60R 16/0238 |
| CN | 112623023 | A * | 4/2021 | |
| CN | 112955365 | A * | 6/2021 | B62D 5/003 |
| CN | 113247088 | A * | 8/2021 | B62D 5/0403 |
| CN | 112590921 | B * | 2/2022 | B62D 5/043 |
| CN | 114148405 | A * | 3/2022 | B62D 5/0463 |
| CN | 110091912 | B * | 11/2022 | B62D 15/025 |
| CN | 115402401 | A * | 11/2022 | B62D 5/001 |
| CN | 113247088 | B * | 2/2023 | B62D 5/0403 |
| CN | 115989171 | A * | 4/2023 | B60W 50/10 |
| CN | 110001765 | B * | 12/2023 | B62D 5/0424 |
| DE | 19834870 | A1 * | 2/2000 | B62D 5/001 |
| DE | 102018116367 | A1 * | 1/2019 | B60R 16/0238 |
| DE | 102022206518 | A1 * | 12/2023 | B62D 5/006 |
| DE | 102022206630 | A1 * | 1/2024 | B62D 5/006 |
| EP | 1512609 | A1 * | 3/2005 | B62D 5/003 |
| EP | 2738067 | A1 * | 6/2014 | B62D 5/003 |
| EP | 1512609 | B1 * | 3/2015 | B62D 5/003 |
| EP | 2738067 | B1 * | 4/2019 | B62D 5/003 |
| JP | 2004010024 | A * | 1/2004 | B62D 5/003 |
| JP | 2004314891 | A * | 11/2004 | B62D 5/006 |
| JP | 2005-335587 | A | 12/2005 | |
| JP | 3839358 | B2 * | 11/2006 | B62D 5/003 |
| JP | 2013028312 | A * | 2/2013 | B62D 5/003 |
| JP | 5816019 | B2 * | 11/2015 | B62D 5/003 |
| JP | 2017013542 | A * | 1/2017 | |
| JP | 2020075559 | A * | 5/2020 | B62D 5/003 |
| JP | 2022020407 | A * | 2/2022 | B60W 50/10 |
| JP | 7061055 | B2 * | 4/2022 | B62D 5/003 |
| JP | 7380467 | B2 * | 11/2023 | B60W 50/10 |
| JP | 2024005499 | A * | 1/2024 | |
| WO | WO-03106244 | A1 * | 12/2003 | B62D 5/003 |
| WO | WO-2013018548 | A1 * | 2/2013 | B62D 5/003 |
| WO | WO-2019243300 | A1 * | 12/2019 | B62D 15/021 |
| WO | WO-2020095752 | A1 * | 5/2020 | B62D 5/003 |
| WO | WO-2022019043 | A1 * | 1/2022 | B60W 50/10 |
| WO | WO-2024002557 | A1 * | 1/2024 | B62D 5/006 |
| WO | WO-2024002558 | A1 * | 1/2024 | B62D 5/006 |
| WO | WO-2024004772 | A1 * | 1/2024 | |

OTHER PUBLICATIONS

Written Opinion dated Dec. 24, 2019 issued in International Application No. PCT/JP2019/042287, with English translation, 15 pages.

* cited by examiner

STEERING APPARATUS

TECHNICAL FIELD

The present invention relates to a steering apparatus.

BACKGROUND ART

PTL 1 discloses a steering apparatus including a steering reaction force controller and a vehicle steering device controller that control actuation of a steering reaction force actuator and a vehicle steering actuator based on respective sensor signals of a steering reaction force motor angle sensor and a rack axial force sensor.

CITATION LIST

Patent Literature

PTL 1: Japanese Patent Application Public Disclosure No. 2005-335587

SUMMARY OF INVENTION

Technical Problem

In the above-described conventional technique, the steering reaction force motor angle sensor and the rack axial force sensor are connected to the steering reaction force controller. The vehicle steering device controller receives the respective sensor signals from the steering reaction force controller via a two-way communication line. The above-described conventional technique has such a problem that, when a failure has occurred in the steering reaction force controller, the vehicle steering device controller cannot acquire the respective sensor signals, thereby being unable to continue the steering control.

Solution to Problem

One of objects of the present invention is to provide a steering apparatus capable of continuing steering control by a steering mechanism controller even when the steering mechanism controller cannot acquire information about a steering input mechanism via a steering input mechanism controller.

According to one aspect of the present invention, a steering apparatus includes a first communication circuit provided between a steering input mechanism and a steering mechanism controller and configured to output a first steering operation amount signal output from a first steering operation amount signal output portion to the steering mechanism controller, and a second communication circuit provided between the steering input mechanism and the steering mechanism controller and configured to output a second steering operation amount signal to the steering mechanism controller without intervention of an input mechanism second microprocessor.

Advantageous Effects of Invention

Therefore, according to the one aspect of the present invention, the steering apparatus can continue the steering control by the steering mechanism controller even when the steering mechanism controller cannot acquire the information about the steering input mechanism via the steering input mechanism controller.

DESCRIPTION OF EMBODIMENTS

First Embodiment

Figure 1:
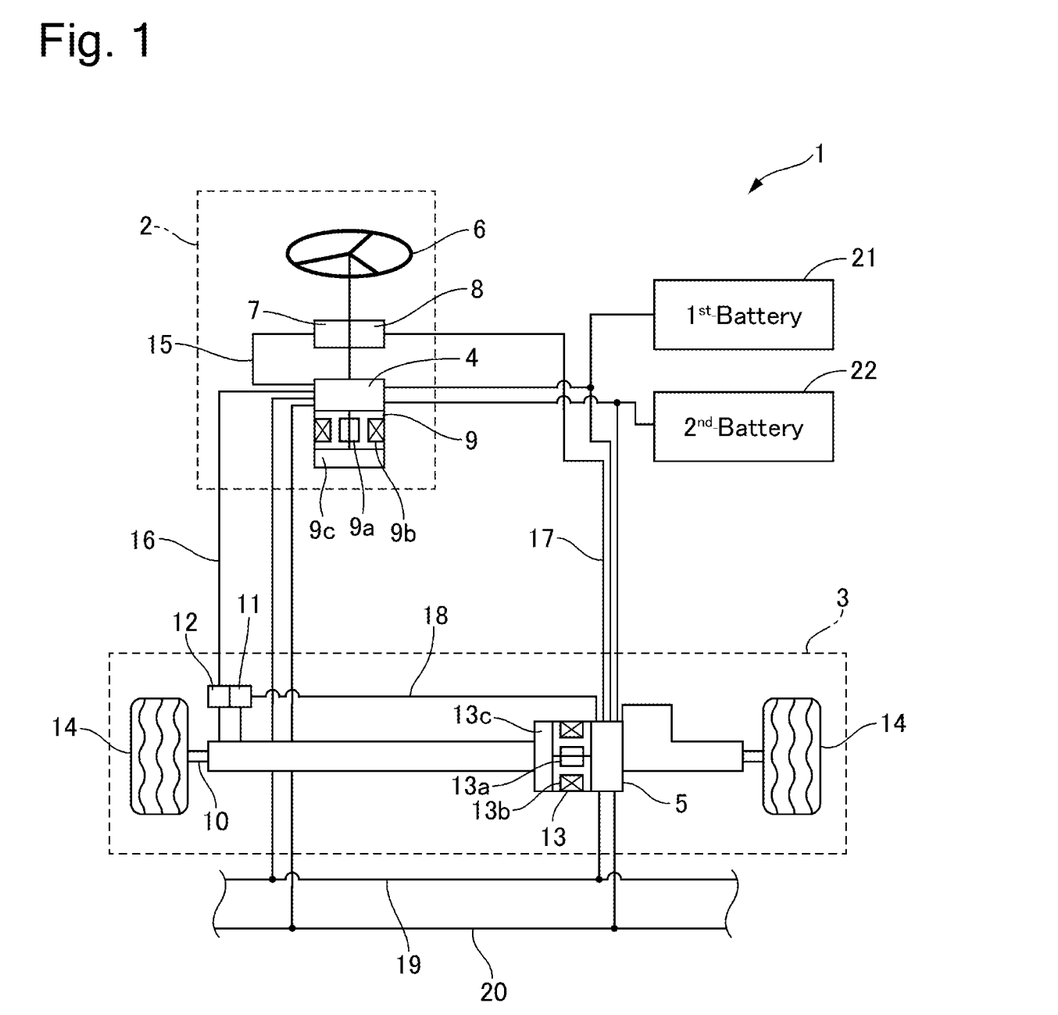
FIG. 1 illustrates the configuration of a steering apparatus 1 according to a first embodiment.

FIG. 1 illustrates the configuration of a steering apparatus 1 according to a first embodiment.

The steering apparatus 1 is a so-called steer-by-wire steering apparatus, in which a steering wheel (a steering operation input member) 6 and a steering mechanism 3 for steering front wheels (a wheel to be steered) 14 are mechanically separated from each other. The steering apparatus 1 includes a steering input mechanism 2, the steering mechanism 3, a steering input mechanism controller 4, and a steering mechanism controller 5.

The steering input mechanism 2 includes the steering wheel 6, a first steering angle sensor (a first steering operation amount sensor) 7, a second steering angle sensor (a second steering operation amount sensor) 8, and a first electric motor 9. The steering wheel 6 rotates according to a steering operation performed by a driver. The first steering angle sensor 7 detects the rotational amount of the steering wheel 6 and outputs a first steering operation amount signal according to the detected rotational amount. The second steering angle sensor 8 detects the rotational amount of the steering wheel 6 and outputs a second steering operation amount signal according to the detected rotational amount. The first steering operation amount signal and the second steering operation amount signal are analog signals according to the rotational amount of the steering wheel 6 or digital signals encoded into SENT messages based on the SPC (Short PWM Code) protocol based on SENT (Single Edge Nibble Transmission). The first electric motor 9 is a reaction force actuator that generates a force for increasing a steering load against the driver's steering operation (a steering reaction force) on the steering wheel 6. The first electric motor 9 includes a first rotor 9a, a first stator 9b, and a first motor rotational angle sensor 9c. The first motor rotational angle sensor 9c detects the rotational position of the first motor 9a, and outputs a first motor rotational angle signal according to the detected rotational position. The first motor rotational angle sensor 9c includes two motor rotational angle sensors 9c1 and 9c2 (refer to FIG. 2).

The steering mechanism 3 includes a rack bar (a steering member) 10, a first rack position sensor (a first steering amount sensor) 11, a second rack position sensor (a second steering amount sensor) 12, and a second electric motor 13. The rack bar 10 is movable in the vehicle width direction, and steers the front wheels 14 according to the movement amount. The first rack position sensor 11 detects the position of the rack bar 10, and outputs a first operation amount signal according to the detected position. The steering angles of the front wheels 14 are uniquely determined according to the position of the rack bar 10, and therefore the first operation amount signal is a signal regarding the steering angles of the front wheels 14. The second rack position sensor 12 detects the position of the rack bar 10, and outputs a second operation amount signal according to the detected position. The first operation amount signal and the second operation amount signal are analog signals according to the position of the rack bar 10 or digital signals encoded into SENT messages based on the SPC (Short PWM Code) protocol based on SENT (Single Edge Nibble Transmission). The second electric motor 13 is a steering actuator that generates a force for steering the front wheels 14 via the rack bar 10 based on a steering actuator driving signal from the steering mechanism controller 5. The second electric motor 13 includes a second rotor 13a, a second stator 13b, and a second motor rotational angle sensor 13c. The second motor rotational angle sensor 13c detects the rotational position of the second motor 13a, and outputs a second motor rotational angle signal according to the detected rotational position. The second motor rotational angle sensor 13c includes two motor rotational angle sensors 13c1 and 13c2 (refer to FIG. 2).

The steering input mechanism controller 4 and the first steering angle sensor 7 are directly connected to each other via a communication line 15. The steering input mechanism controller 4 and the second rack position sensor 12 are directly connected to each other via a communication line 16. The steering input mechanism controller 4 drives and controls the first electric motor 9 based on the first steering operation amount signal or the second steering operation amount signal and the first steering amount signal or the second steering amount signal. The steering input mechanism controller 4 receives the first steering amount signal from the steering mechanism controller 5 via a first CAN communication line (a first communication circuit) 19 provided between the steering input mechanism 2 and the steering mechanism controller 5. Further, the steering input mechanism controller 4 receives the second steering operation amount signal via a second CAN communication line (a third communication circuit) 20 provided between the steering input mechanism 2 and the steering mechanism controller 5. The steering input mechanism controller 4 generates a signal regarding the rotational amount of the steering wheel 6 based on the first motor rotational angle signal, and drives and controls the first electric motor 9 based on the generated signal, when a failure has occurred in the first steering angle sensor 7 and the second steering angle sensor 8.

The steering mechanism controller 5 and the second steering angle sensor 8 are directly connected to each other via a communication line (a second communication circuit) 17. Further, the steering mechanism controller 5 and the first rack position sensor 11 are directly connected to each other via a communication line 18. The steering mechanism controller 5 drives and controls the second electric motor 13 based on the first steering operation amount signal or the second steering operation amount signal and the first steering amount signal or the second steering amount signal. The steering mechanism controller 5 receives the first steering amount signal from the steering input mechanism controller 4 via the first CAN communication line 19. Further, the steering mechanism controller 5 receives the second steering amount signal from the steering input mechanism controller 4 via the second CAN communication line 20. The steering mechanism controller 5 generates a signal regarding the steering angles of the front wheels 14 based on the second motor rotational angle signal, and drives and controls the second electric motor 13 based on the generated signal, when a failure has occurred in the first rack position sensor 11 and the second rack position sensor 12.

The steering input mechanism controller 4 and the steering mechanism controller 5 receive electric power from a first battery 21 and a second battery 22. The first electric motor 9, the first steering angle sensor 7, and the second rack position sensor 12 receive power supply from the steering input mechanism controller 4. The second electric motor 13, the second steering angle sensor 8, and the first rack position sensor 11 receive power supply from the steering mechanism controller 5.

The steering input mechanism controller 4 drives and controls the second electric motor 13 based on the first steering operation amount signal, the second steering amount signal, the vehicle speed, and the like, when a failure has occurred in the steering mechanism controller 5. Further, the steering mechanism controller 5 drives and controls the first electric motor 9 based on the second steering operation amount signal, the first steering amount signal, the vehicle speed, and the like, when a failure has occurred in the steering input mechanism controller 4.

Figure 2:
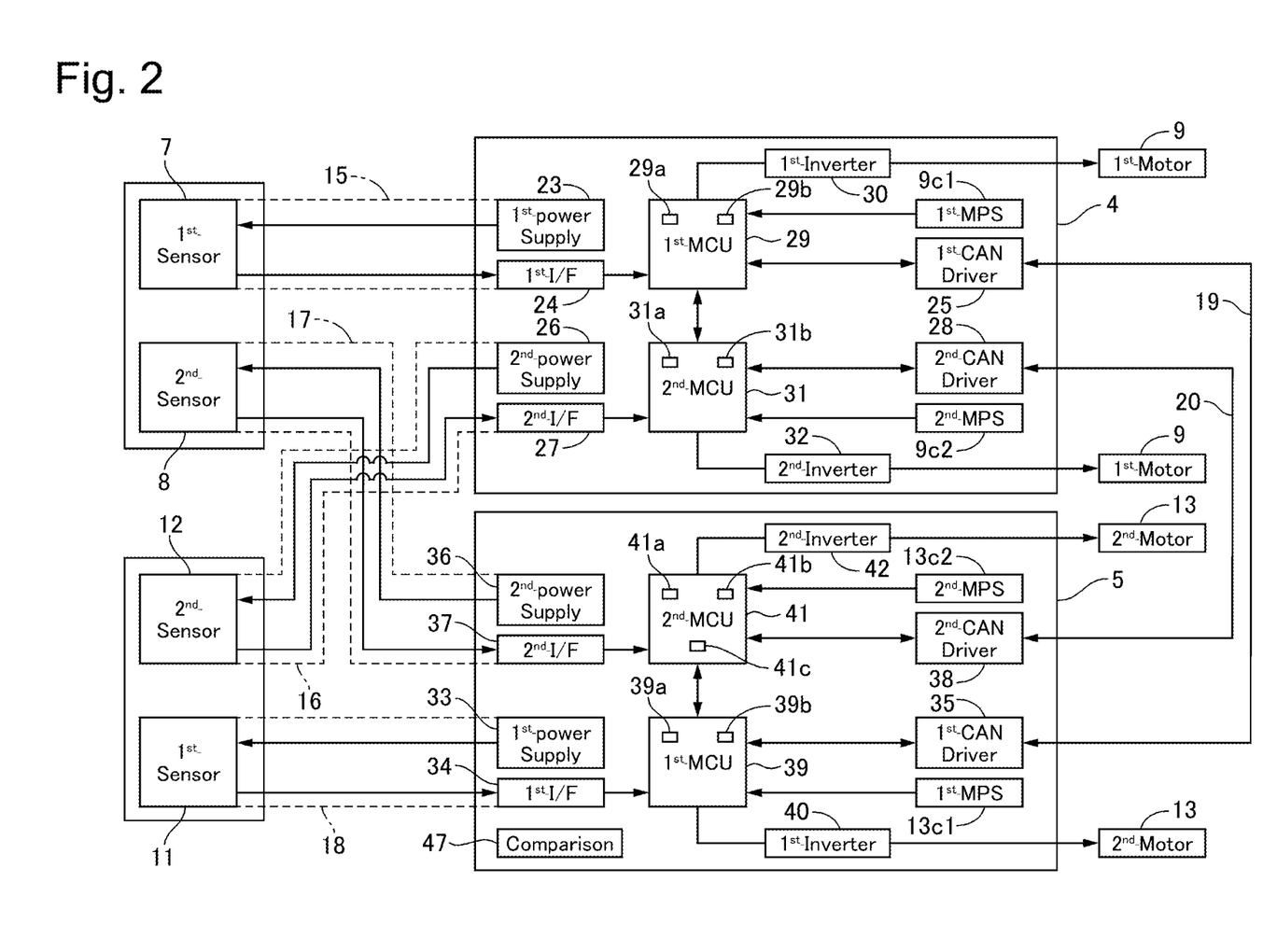
FIG. 2 is a circuit block diagram of the steering apparatus 1 according to the first embodiment.

FIG. 2 is a circuit block diagram of the steering apparatus 1 according to the first embodiment.

First, the configuration of the steering input mechanism controller 4 will be described.

A first power supply 23 generates a power source of the first steering angle sensor 7 and supplies it. The first power supply 23 is connected to the first battery 21. A first interface 24 decodes the first steering operation amount signal received from the first steering angle sensor 7. A first CAN driver 25 carries out CAN communication with a first CAN driver 35 of the steering mechanism controller 5 via the first CAN communication line 19. A second power supply 26 generates a power source of the second rack position sensor 12 and supplies it. The second power supply 26 is connected to the second battery 22. A second interface 27 decodes the second steering operation amount signal received from the second rack position sensor 12. A second CAN driver 28 carries out CAN communication with a second CAN driver 38 of the steering mechanism controller 5 via the second CAN communication line 20.

A first microprocessor (an input mechanism first microprocessor) 29 includes a first reaction force actuator control portion 29a and a first steering operation amount signal output portion 29b. The first reaction force actuator control portion 29a inputs the first steering operation amount signal from the first interface 24 and the first steering amount signal from the first CAN driver 25, and outputs a first reaction force actuator driving signal for driving and controlling the first electric motor 9. The first reaction force actuator control portion 29a outputs a first steering operation amount signal output instruction signal for instructing the first steering angle sensor 7 to start outputting the first steering operation amount signal. The first steering angle sensor 7 outputs the first steering operation amount signal when receiving the first steering operation amount signal output instruction signal. The first steering operation amount signal output portion 29b outputs the first steering operation amount signal to the first CAN driver 25. A first inverter 30 converts direct-current power received from the first battery 21 into alternating-current power based on the first reaction force actuator driving signal, and supplies it to the first electric motor 9.

A second microprocessor (an input mechanism second microprocessor) 31 includes a second reaction force actuator control portion 31a and a second steering operation amount signal output portion 31b. The second reaction force actuator control portion 31a inputs the second steering amount signal from the second interface 27 and the second steering operation amount signal from the second CAN driver 28, and outputs a second reaction force actuator driving signal for driving and controlling the first electric motor 9. The second reaction force actuator control portion 31a outputs a second steering amount signal output instruction signal for instructing the second rack position sensor 12 to start outputting the second steering amount signal. The second rack position sensor 12 outputs the second steering amount signal when receiving the second steering amount signal output instruction signal. A second inverter 32 converts direct-current power received from the second battery 22 into alternating-current power based on the second reaction force actuator driving signal, and supplies it to the first electric motor 9.

Next, the configuration of the steering mechanism controller 5 will be described.

A first power supply 33 generates a power source of the first rack position sensor 11 and supplies it. The first power supply 33 is connected to the first battery 21. A first interface 34 decodes the first steering amount signal received from the first rack position sensor 11. The first CAN driver 35 carries out CAN communication with the first CAN driver 25 of the steering input mechanism controller 4 via the first CAN communication line 19. A second power supply 36 generates a power source of the second steering angle sensor 8 and supplies it. The second power supply 36 is connected to the second battery 22. A second interface 37 decodes the second steering operation amount signal received from the second steering angle sensor 8. The second CAN driver 38 carries out CAN communication with the second CAN driver 28 of the steering input mechanism controller 4 via the second CAN communication line 20.

A first microprocessor (a steering mechanism first microprocessor) 39 includes a first steering actuator control portion 39a and a first steering amount signal output portion 39b. The first steering actuator control portion 39a inputs the first steering amount signal from the first interface 34 and the first steering operation amount signal from the first CAN driver 35, and outputs a first steering actuator driving signal for driving and controlling the second electric motor 13. The first steering actuator control portion 39a outputs a first steering amount signal output instruction signal for instructing the first rack position sensor 11 to start outputting the first steering amount signal. The first rack position sensor 11 outputs the first steering amount signal when receiving the first steering amount signal output instruction signal. The first steering amount signal output portion 39b outputs the first steering amount signal to the first CAN driver 35. A first inverter 40 converts direct-current power received from the first battery 21 into alternating-current power based on the first steering actuator driving signal, and supplies it to the second electric motor 13.

A second microprocessor (a steering mechanism second microprocessor) 41 includes a second steering actuator control portion 41a and a second steering amount signal output portion 41b. The second steering actuator control portion 41a inputs the second steering operation amount signal from the second interface 37 and the second steering amount signal from the second CAN driver 38, and outputs a second steering actuator driving signal for driving and controlling the second electric motor 13. The second steering actuator control portion 41a outputs a second steering operation amount signal output instruction signal for instructing the second steering angle sensor 8 to start outputting the second steering operation amount signal. The second steering angle sensor 8 outputs the second steering operation amount signal when receiving the second steering operation amount signal output instruction signal. A second inverter 42 converts direct-current power received from the second battery 22 into alternating-current power based on the second steering actuator driving signal, and supplies it to the second electric motor 13.

The steering mechanism controller 5 includes a signal comparison portion 47. The signal comparison portion 47 determines whether an abnormality has occurred in the first steering operation amount signal or the second steering operation amount signal by comparing the first steering operation amount signal transmitted from the steering input mechanism 2 to the steering mechanism controller 5 via the first CAN communication line 19 and the second steering operation amount signal transmitted from the steering input mechanism 2 to the steering mechanism controller 5 via the communication line 17.

The steering input mechanism controller 4 according to the first embodiment includes the two microprocessors 29 and 31. Therefore, even when a failure has occurred in the first microprocessor 29, the steering input mechanism controller 4 can drive and control the first electric motor 9 by the second microprocessor 31 and continue the reaction force control. Further, the steering mechanism controller 5 includes the two microprocessors 39 and 41. Therefore, even when a failure has occurred in the first microprocessor 39, the steering mechanism controller 5 can drive the second electric motor 13 by the second microprocessor 41 and continue the steering control.

Next, functions and advantageous effects of the first embodiment will be described.

The steer-by-wire steering apparatus includes the steering controller that drives and controls the steering actuator for steering the wheel to be steered, and the reaction force controller that drives and controls the reaction force actuator for applying the steering reaction force to the steering wheel. The conventional steering apparatus connects the steering controller and the reaction force controller via the two-way communication line and allows the information to be exchanged therebetween. Therefore, in the above-described conventional configuration, when a failure such as a disconnection has occurred in the two-way communication line, the steering controller cannot acquire the angle of the steering wheel and cannot continue the steering control. Therefore, the conventional technique necessitates a backup mechanism such as a shaft and a clutch for mechanically connecting the steering wheel and the steering mechanism, thereby raising a problem of leading to a cost increase.

On the other hand, the steering apparatus 1 according to the first embodiment includes the first CAN communication line 19 provided between the steering input mechanism 2 and the steering mechanism controller 5 and configured to output the first steering operation amount signal output from the first steering operation amount signal output portion 29b to the steering mechanism controller 5, and the communication line 17 provided between the steering input mechanism 2 and the steering mechanism controller 5 and configured to output the second steering operation amount signal to the steering mechanism controller 5 without the intervention of the first microprocessor 29. For example, when an abnormality has occurred in the first CAN communication line 19 or an abnormality has occurred in the power source circuit of the steering input mechanism controller 4, such an abnormality makes it impossible to transmit the first steering operation amount signal to the steering mechanism controller 5. At this time, since the steering apparatus 1 according to the first embodiment includes the communication line 17 that allows the second steering operation amount signal to be transmitted to the steering mechanism controller 5 without the intervention of the first microprocessor 29, the steering mechanism controller 5 can receive the second steering operation amount signal and continue the steering control based on the second steering operation amount signal even when being unable to receive the first steering operation amount signal via the first CAN communication line 19. As a result, the present configuration eliminates the necessity of the backup mechanism for mechanically connecting the steering wheel 6 and the steering mechanism 3, thereby being able to prevent the cost increase.

The steering apparatus 1 includes the second CAN communication line 20 provided between the steering input mechanism 2 and the steering mechanism controller 5, and configured to output the second steering operation amount signal output from the second steering operation amount signal output portion 31*b* of the second microprocessor 31 to the steering mechanism controller 5. Due to this configuration, even when a failure has occurred in the first CAN communication line 19, the steering mechanism controller 5 can receive the second steering amount signal via the second CAN communication line 20. Therefore, even when the first microprocessor 39 cannot receive the first steering amount signal, the steering mechanism controller 5 can continue the steering control based on the second steering amount signal.

The first steering angle sensor 7 and the second steering angle sensor 8 output the rotational amount of the steering wheel 6. Therefore, even when a failure has occurred in the steering input mechanism controller 4, the steering mechanism controller 5 can acquire the second steering amount signal via the communication line 17, thereby performing the steering control according to the rotational amount of the steering wheel 6, i.e., the steering control in conformity with the steering intention of the driver.

The first electric motor 9 includes the first rotor 9*a*, the first stator 9*b*, and the first motor rotational angle sensor 9*c*. The first motor rotational angle sensor 9*c* can detect the rotational position of the first rotor 9*a*. The steering input mechanism controller 4 generates the signal regarding the rotational amount of the steering wheel 6 based on the output signal of the first motor rotational angle sensor 9*c*. Due to this configuration, even when a failure has occurred in both the first steering angle sensor 7 and the second steering angle sensor 8, the steering input mechanism controller 4 can acquire the information regarding the rotational amount of the steering wheel 6 based on the output signal of the first motor rotational angle sensor 9*c*.

The second electric motor 13 includes the second rotor 13*a*, the second stator 13*b*, and the second motor rotational angle sensor 13*c*. The second motor rotational angle sensor 13*c* can detect the rotational position of the second rotor 13*a*. The steering mechanism controller 5 generates the signal regarding the steering angles of the front wheels 14 based on the output signal of the second motor rotational angle sensor 13*c*. Due to this configuration, even when a failure has occurred in both the first rack position sensor 11 and the second rack position sensor 12, the steering mechanism controller 5 can acquire the information regarding the steering angles of the front wheels 14 based on the output signal of the second motor rotational angle sensor 13*c*.

The second steering angle sensor 8 receives the power supply from the steering mechanism controller 5. Due to this configuration, even when a failure has occurred in the power source circuit of the steering input mechanism 2, the second steering angle sensor 8 receives the power supply from the steering mechanism controller 5, thereby being able to continue outputting the second steering amount signal.

The steering mechanism controller 5 outputs the second steering operation amount signal output instruction signal for instructing the second steering angle sensor 8 to start outputting the second steering operation amount signal. The second steering angle sensor 8 outputs the second steering operation amount signal to the steering mechanism controller 5 when receiving the second steering operation amount signal output instruction signal. Due to this configuration, even when a failure has occurred in the power source circuit of the steering input mechanism 2, the second steering angle sensor 8 can receive the second steering operation amount signal output instruction signal from the steering mechanism controller 5, thereby continuing outputting the second steering operation amount signal.

The signal comparison portion 47 of the steering mechanism controller 5 determines whether an abnormality has occurred in the first steering operation amount signal or the second steering operation amount signal by comparing the first steering operation amount signal transmitted from the steering input mechanism 2 to the steering mechanism controller 5 via the first CAN communication line 19 and the second steering operation amount signal transmitted from the steering input mechanism 2 to the steering mechanism controller 5 via the communication line 17. Due to this configuration, even when a failure has occurred in the second microprocessor 41, an abnormality in the signal can be determined based on the comparison between the first steering operation amount signal and the second steering operation amount signal.

Second Embodiment

A second embodiment has a basic configuration similar to the first embodiment, and therefore will be described focusing only on differences therefrom.

Figure 3:
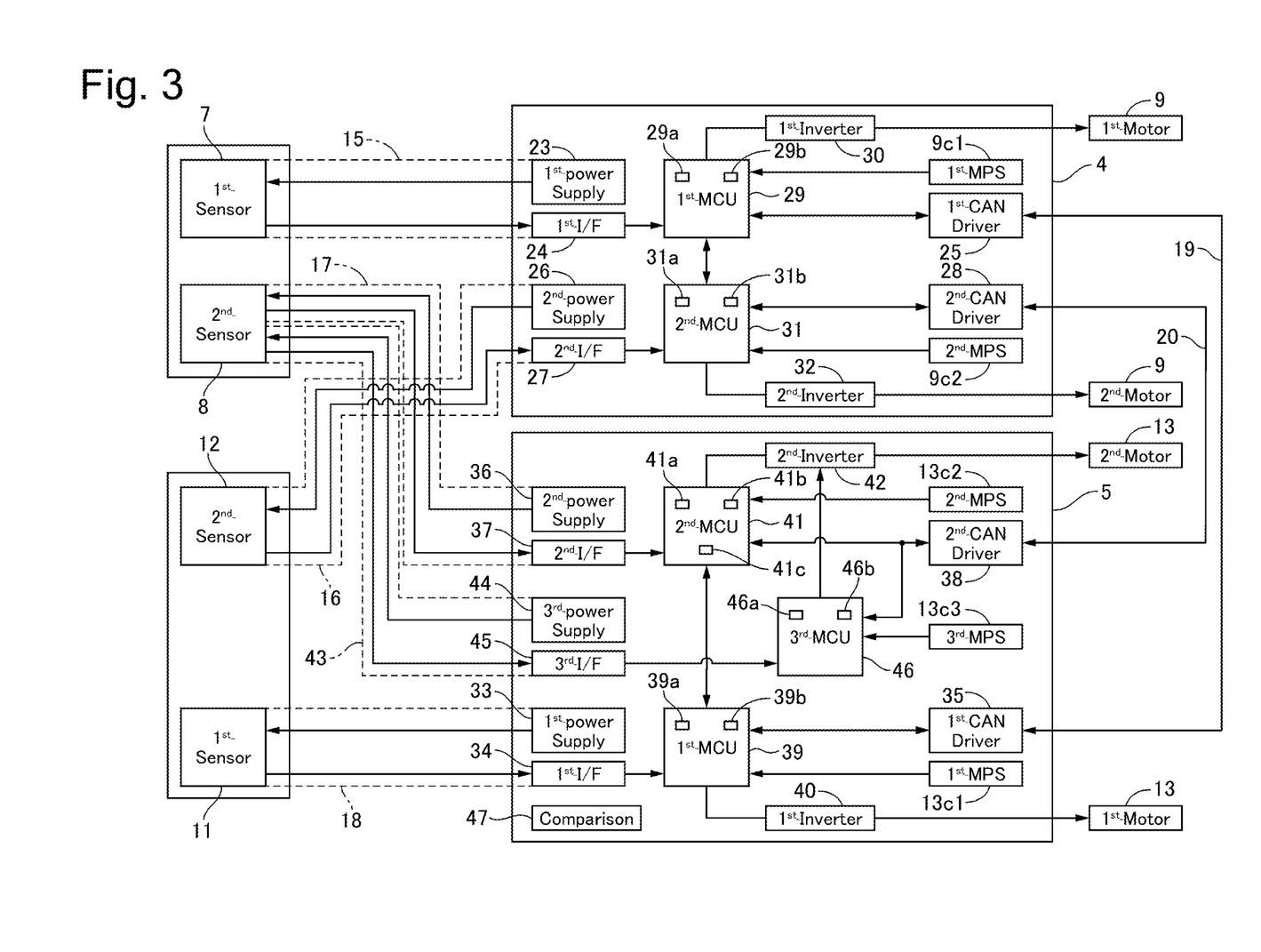
FIG. 3 is a circuit block diagram of a steering apparatus 1A according to a second embodiment.

FIG. 3 is a circuit block diagram of a steering apparatus 1A according to a second embodiment.

The second steering angle sensor 8 and the steering mechanism controller 5 are directly connected to each other via a communication line 43.

A third power supply 44 generates a power source of the second steering angle sensor 8 and supplies it. The third power supply 44 is connected to the first battery 21 and the second battery 22. A third interface 45 decodes the second steering operation amount signal received from the second steering angle sensor 8. The second motor rotational angle sensor 13*c* includes three motor rotational angle sensors 13*c*1, 13*c*2, and 13*c*3.

The steering mechanism controller 5 includes a third microprocessor (a steering mechanism third microprocessor) 46. The third microprocessor 46 includes a third steering actuator control portion 46*a* and a third steering amount signal output portion 46*b*. The third steering actuator control portion 46*a* inputs the second steering operation amount signal from the third interface 45 and the second steering amount signal from the second CAN driver 38, and outputs a third steering actuator driving signal for driving and controlling the second electric motor 13. The third steering actuator control portion 46*a* outputs the second steering operation amount signal output instruction signal for instructing the second steering angle sensor 8 to start outputting the second steering operation amount signal. The second steering angle sensor 8 outputs the second steering operation amount signal when receiving the second steering operation amount signal output instruction signal. The second inverter 42 converts direct-current power received from the first battery 21 or the second battery 22 into alternating-current power based on the third steering actuator driving signal, and supplies it to the second electric motor 13.

Since the steering apparatus 1A according to the second embodiment includes the third microprocessor 46, the steering mechanism controller 5 can continue the steering control based on the second steering operation amount signal even when a failure has occurred in both the first microprocessor 39 and the second microprocessor 41.

Other Embodiments

Having described the embodiments for implementing the present invention, the specific configuration of the present invention is not limited to the configurations of the embodiments, and the present invention also includes even a design modification and the like thereof made within a range that does not depart from the spirit of the present invention, if any.

For example, the steering member is not limited to the rack bar and the pitman arm, and also includes another link mechanism provided between the steering actuator and the wheel to be steered.

The first and second steering amount signals are not limited to, for example, the signals regarding the stroke position of the rack bar, and may be signals regarding a rotational amount of a member that rotates according to the movement of the rack bar, and, besides it, also include a signal that changes according to a change in the steering angle of the wheel to be steered and makes it possible to estimate the steering angle of the wheel to be steered.

In the following description, technical ideas recognizable from the above-described embodiments will be described.

A steering apparatus, according to one configuration thereof, includes a steering input mechanism including a steering operation input member, a first steering operation amount sensor and a second steering operation amount sensor, and a reaction force actuator. The steering operation input member is movable according to a steering operation performed by a driver. The first steering operation amount sensor can output a first steering operation amount signal, which is a signal regarding a movement amount of the steering operation input member. The second steering operation amount sensor can output a second steering operation amount signal, which is a signal regarding the movement amount of the steering operation input member. The reaction force actuator can generate a force for increasing a steering load against the steering operation performed by the driver on the steering operation input member. The steering apparatus further includes a steering mechanism including a steering member, a first steering amount sensor, a second steering amount sensor, and a steering actuator. The first steering amount sensor can output a first steering amount signal, which is a signal regarding a steering angle of the wheel to be steered. The second steering amount sensor can output a second steering amount signal, which is a signal regarding the steering angle of the wheel to be steered. The steering actuator can generate a force for steering the wheel to be steered via the steering member based on a steering actuator driving signal. The steering apparatus further includes a steering input mechanism controller including an input mechanism first microprocessor and an input mechanism second microprocessor. The input mechanism first microprocessor includes a first reaction force actuator control portion and a first steering operation amount signal output portion. The first reaction force actuator control portion outputs a first reaction force actuator driving signal for driving and controlling the reaction force actuator. The first steering operation amount signal output portion can output the first steering amount signal to a steering mechanism controller. The input mechanism second microprocessor includes a second reaction force actuator control portion. The second reaction force actuator control portion outputs a second reaction force actuator driving signal for driving and controlling the reaction force actuator. The steering apparatus further includes the steering mechanism controller including a steering mechanism first microprocessor and a steering mechanism second microprocessor. The steering mechanism first microprocessor includes a first steering actuator control portion. The first steering actuator control portion outputs a first steering actuator driving signal for driving and controlling the steering actuator based on the first steering operation amount signal or the second steering operation amount signal and the first steering amount signal or the second steering amount signal. The steering mechanism second microprocessor includes a second steering actuator control portion. The second steering actuator control portion outputs a second steering actuator driving signal for driving and controlling the steering actuator based on the first steering operation amount signal or the second steering operation amount signal and the first steering amount signal or the second steering amount signal. The steering apparatus further includes a first communication circuit provided between the steering input mechanism and the steering mechanism controller and configured to output the first steering operation amount signal output from the first steering operation amount signal output portion to the steering mechanism controller. The steering apparatus further includes a second communication circuit provided between the steering input mechanism and the steering mechanism controller and configured to output the second steering operation amount signal to the steering mechanism controller without intervention of the input mechanism first microprocessor.

Preferably, in the above-described configuration, the steering apparatus further includes a third communication circuit. The input mechanism second microprocessor includes a second steering operation amount signal output portion. The third communication circuit is provided between the steering input mechanism and the steering mechanism controller, and is configured to output the second steering operation amount signal output from the second steering operation amount signal output portion to the steering mechanism controller.

According to another preferable configuration, in any of the above-described configurations, the steering input mechanism is a steering wheel. The first steering operation amount sensor is a first steering angle sensor that detects a rotational amount of the steering wheel. The second steering operation amount sensor is a second steering angle sensor that detects the rotational amount of the steering wheel.

According to further another preferable configuration, in any of the above-described configurations, the reaction force actuator is a first electric motor. The first electric motor includes a first rotor, a first stator, and a first motor rotational angle sensor. The first motor rotational angle sensor can detect a rotational position of the first rotor. The steering input mechanism controller generates a signal regarding the rotational amount of the steering wheel based on an output signal of the first motor rotational angle sensor.

According to further another preferable configuration, in any of the above-described configurations, the steering actuator is a second electric motor. The second electric motor includes a second rotor, a second stator, and a second motor rotational angle sensor. The second motor rotational angle sensor can detect a rotational position of the second rotor. The steering mechanism controller generates a signal regarding the steering angle of the wheel to be steered based on an output signal of the second motor rotational angle sensor.

According to further another preferable configuration, in any of the above-described configurations, the second steering operation amount sensor receives power supply from the steering mechanism controller.

According to further another preferable configuration, in any of the above-described configurations, the steering mechanism controller outputs a second steering operation amount signal output instruction signal for instructing the second steering operation amount sensor to start outputting the second steering operation amount signal. The second steering operation amount sensor outputs the second steering operation amount signal to the steering mechanism controller when receiving the second steering operation amount signal output instruction signal.

According to further another preferable configuration, in any of the above-described configurations, the steering mechanism controller further includes a steering mechanism third microprocessor. The steering mechanism third microprocessor includes a third steering actuator control portion. The third steering actuator control portion outputs a third steering actuator driving signal for driving and controlling the steering actuator based on the first steering operation amount signal or the second steering operation amount signal and the first steering amount signal or the second steering amount signal.

According to further another preferable configuration, in any of the above-described configurations, the steering mechanism controller includes a signal comparison portion. The signal comparison portion determines whether an abnormality has occurred in the first steering operation amount signal or the second steering operation amount signal by comparing the first steering operation amount signal transmitted from the steering input mechanism to the steering mechanism controller via the first communication circuit and the second steering operation amount signal transmitted from the steering input mechanism to the steering mechanism controller via the second communication circuit.

The present invention shall not be limited to the above-described embodiments, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2018-207834 filed on Nov. 6, 2018. The entire disclosure of Japanese Patent Application No. 2018-207834 filed on Nov. 6, 2018 including the specification, the claims, the drawings, and the abstract is incorporated herein by reference in its entirety.

REFERENCE SIGNS LIST 1 steering apparatus
2 steering input mechanism
3 steering mechanism
4 steering input mechanism controller
5 steering mechanism controller
6 steering wheel (steering operation input member)
7 first steering angle sensor (first steering operation amount sensor)
8 second steering angle sensor (second steering operation amount sensor)
9 first electric motor (reaction force actuator)
9a first rotor
9b first stator
9c first motor rotational angle sensor
10 rack bar (steering member)
11 first rack position sensor (first steering amount sensor)
12 second rack position sensor (second steering amount sensor)
13 second electric motor (steering actuator)
13a second rotor
13b second stator
13c second motor rotational angle sensor
14 front wheel (wheel to be steered)
17 communication line (second communication circuit)
19 first CAN communication line (first communication circuit)
20 second CAN communication line (third communication circuit)
29 first microprocessor (input mechanism first microprocessor)
29a first reaction force actuator control portion
29b first steering operation amount signal output portion
31 second microprocessor (input mechanism second microprocessor)
31a second reaction force actuator control portion
39 first microprocessor (steering mechanism first microprocessor)
39a second steering actuator control portion
39b second steering operation amount signal output portion
41 second microprocessor (steering mechanism second microprocessor)
41a second steering actuator control portion
46 third microprocessor (steering mechanism third microprocessor)
46a third steering actuator control portion
47 signal comparison portion

The invention claimed is:
1. A steering apparatus comprising:
a steering input mechanism including a steering operation input member, a first steering operation amount sensor and a second steering operation amount sensor, and a reaction force actuator,
the steering operation input member being movable according to a steering operation performed by a driver,
the first steering operation amount sensor being capable of outputting a first steering operation amount signal, which is a signal regarding a movement amount of the steering operation input member,
the second steering operation amount sensor being capable of outputting a second steering operation amount signal, which is a signal regarding the movement amount of the steering operation input member,
the reaction force actuator being capable of generating a force for increasing a steering load against the steering operation performed by the driver on the steering operation input member;
a steering mechanism including a steering member, a first steering amount sensor, a second steering amount sensor, and a steering actuator, the first steering amount sensor being capable of outputting a first steering amount signal, which is a signal regarding a steering angle of a wheel to be steered, the second steering amount sensor being capable of outputting a second steering amount signal, which is a signal regarding the steering angle of the wheel to be steered, the steering actuator being capable of generating a force for steering the wheel to be steered via the steering member based on a steering actuator driving signal;

a steering input mechanism controller including an input mechanism first microcontroller and an input mechanism second microcontroller, the input mechanism first microcontroller including a first reaction force actuator control portion and a first steering operation amount signal output portion, the first reaction force actuator control portion being configured to output a first reaction force actuator driving signal for driving and controlling the reaction force actuator, the first steering operation amount signal output portion being capable of outputting the first steering operation amount signal to a steering mechanism controller, the input mechanism second microcontroller including a second reaction force actuator control portion, the second reaction force actuator control portion being configured to output a second reaction force actuator driving signal for driving and controlling the reaction force actuator;

the steering mechanism controller including a steering mechanism first microcontroller and a steering mechanism second microcontroller, the steering mechanism first microcontroller including a first steering actuator control portion, the first steering actuator control portion being configured to output a first steering actuator driving signal for driving and controlling the steering actuator based on the first steering operation amount signal or the second steering operation amount signal and the first steering amount signal or the second steering amount signal, the steering mechanism second microcontroller including a second steering actuator control portion, the second steering actuator control portion being configured to output a second steering actuator driving signal for driving and controlling the steering actuator based on the first steering operation amount signal or the second steering operation amount signal and the first steering amount signal or the second steering amount signal;

a first communication circuit provided between the steering input mechanism and the steering mechanism controller and configured to output the first steering operation amount signal output from the first steering operation amount signal output portion to the steering mechanism first microcontroller; and a second communication circuit provided between the steering input mechanism and the steering mechanism controller and configured to output the second steering operation amount signal to the steering mechanism second microcontroller without intervention of the input mechanism first microcontroller and the input mechanism second microcontroller.

2. The steering apparatus according to claim 1, further comprising a third communication circuit, wherein the input mechanism second microcontroller includes a second steering operation amount signal output portion, and wherein the third communication circuit is provided between the steering input mechanism and the steering mechanism controller, and is configured to output the second steering operation amount signal output from the second steering operation amount signal output portion to the steering mechanism controller.

3. The steering apparatus according to claim 1, wherein the steering input mechanism is a steering wheel, wherein the first steering operation amount sensor is a first steering angle sensor that detects a rotational amount of the steering wheel, and wherein the second steering operation amount sensor is a second steering angle sensor that detects the rotational amount of the steering wheel.

4. The steering apparatus according to claim 3, wherein the reaction force actuator is a first electric motor, wherein the first electric motor includes a first rotor, a first stator, and a first motor rotational angle sensor, wherein the first motor rotational angle sensor can detect a rotational position of the first rotor, and wherein the steering input mechanism controller generates a signal regarding the rotational amount of the steering wheel based on an output signal of the first motor rotational angle sensor.

5. The steering apparatus according to claim 3, wherein the steering actuator is a second electric motor, wherein the second electric motor includes a second rotor, a second stator, and a second motor rotational angle sensor, wherein the second motor rotational angle sensor can detect a rotational position of the second rotor, and wherein the steering mechanism controller generates a signal regarding the steering angle of the wheel to be steered based on an output signal of the second motor rotational angle sensor.

6. The steering apparatus according to claim 1, wherein the second steering operation amount sensor receives power supply from the steering mechanism controller.

7. The steering apparatus according to claim 1, wherein the steering mechanism controller outputs a second steering operation amount signal output instruction signal for instructing the second steering operation amount sensor to start outputting the second steering operation amount signal, and wherein the second steering operation amount sensor outputs the second steering operation amount signal to the steering mechanism controller when receiving the second steering operation amount signal output instruction signal.

8. The steering apparatus according to claim 1, wherein the steering mechanism controller further includes a steering mechanism third microcontroller, wherein the steering mechanism third microcontroller includes a third steering actuator control portion, and wherein the third steering actuator control portion outputs a third steering actuator driving signal for driving and controlling the steering actuator based on the first steering operation amount signal or the second steering operation amount signal and the first steering amount signal or the second steering amount signal.

9. The steering apparatus according to claim 1, wherein the steering mechanism controller includes a signal comparison portion, and wherein the signal comparison portion determines whether an abnormality has occurred in the first steering operation amount signal or the second steering operation amount signal by comparing the first steering operation amount signal transmitted from the steering input mechanism to the steering mechanism controller via the first communication circuit and the second steering operation amount signal transmitted from the steering input mechanism to the steering mechanism controller via the second communication circuit.

* * * * *